United States Patent [19]

Gee et al.

[11] Patent Number: 4,532,815

[45] Date of Patent: Aug. 6, 1985

[54] DETONATION PRODUCTS CATCHER

[75] Inventors: Gary W. Gee, Huntsville; Daniel L. Shumate, Redstone Arsenal; John J. Nieder, Huntsville; Boyd E. Bump, Huntsville; Robert D. Kource, Huntsville, all of Ala.

[73] Assignee: The United States of America as represented by the Secretary of the Army, Washington, D.C.

[21] Appl. No.: 564,619

[22] Filed: Dec. 22, 1983

[51] Int. Cl.³ .............................. G01L 5/14
[52] U.S. Cl. ................... 73/864.63; 73/167; 220/343
[58] Field of Search ........... 73/864.51, 864.63, 864.64, 73/864.65, 864.66, 167; 55/270; 273/410, 404; 220/343; 232/1 R

[56] References Cited

U.S. PATENT DOCUMENTS 1,838,698 12/1931 McElroy et al. .................. 232/1
2,998,897 9/1961 Rudder et al. .................... 220/343
3,658,241 4/1972 Pistocchi ........................... 232/1 R
4,195,840 4/1980 Spieth et al. ...................... 273/404

FOREIGN PATENT DOCUMENTS 457004 9/1913 France .............................. 232/1 R Primary Examiner—Bernard Nozick
Attorney, Agent, or Firm—Anthony T. Lane; Robert P. Gibson; Harold W. Hilton

[57] ABSTRACT

Apparatus for catching a sample of solid high explosive detonation products that get ahead of the shock front during the detonation process. The device is passive. The door of the rectangular box of the device is open to allow the passage of solid products ahead of the shockwave into the box. The door to the box is closed mechanically, by pressure applied to both sides of the bent (angled) door. The shockwave is the source of this pressure. A mechanical latch secures the door on closing. The device is made of steel plate and pipe of sufficient thickness to withstand explosive shock.

6 Claims, 3 Drawing Figures

DETONATION PRODUCTS CATCHER

DEDICATORY CLAUSE

The invention disclosed herein may be manufactured, used and licensed by or for the Government for governmental purposes without the payment to us of any royalties thereon.

BACKGROUND OF THE INVENTION

The device of the present invention is used to trap products produced by warheads. One purpose for trapping detonation products is to determine how far detonation products travel from the point of detonation. Other purposes are to determine how far from the point of detonation do the products burn, whether they burn completely, and where the "crossover point" occurs, i.e., where the reactive material particles overtake the shockwave.

A previous device for catching a sample of detonation products in a shockwave had to be electronically activated an utilized explosively closing doors to retain the detonation products. Such a device is expensive and requires technical expertise. The device of the present invention is relatively inexpensive and operates mechanically in a passive mode.

SUMMARY OF THE INVENTION

Apparatus for catching a sample of high explosive detonation products that get ahead of the shock front during the detonation process. The apparatus includes a rectangular box secured to a pedestal. A tray is secured in the box and an Z-shaped door is pivotally secured to the forward end of the box. As the shock approaches the box pressure is applied to the front bottom half of the door to close the door. Additionally, baffles in the box reflect the shock to the back upper half of the door to assist in closing the door to retain the solid products in the box.

DESCRIPTION OF THE PREFERRED EMBODIMENT

Figure 1:
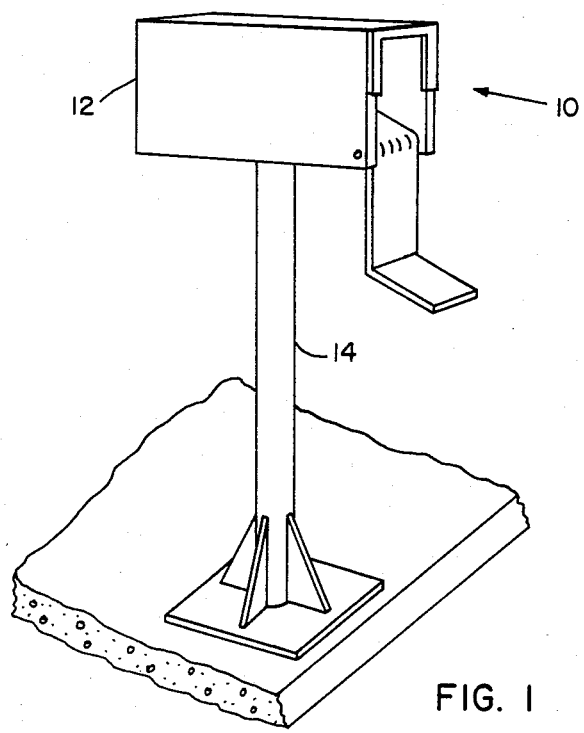
FIG. 1 is a pictorial view of the detonation products catcher of the present invention.

As seen in FIG. 1 the detonation products catcher 10 of the present invention includes a rectangular box 12 mounted on a pedestal 14 which in turn is secured to a concrete footing. The box includes upper and lower substantially parallel surfaces, a closed aft end and an open forward end.

Figure 3:
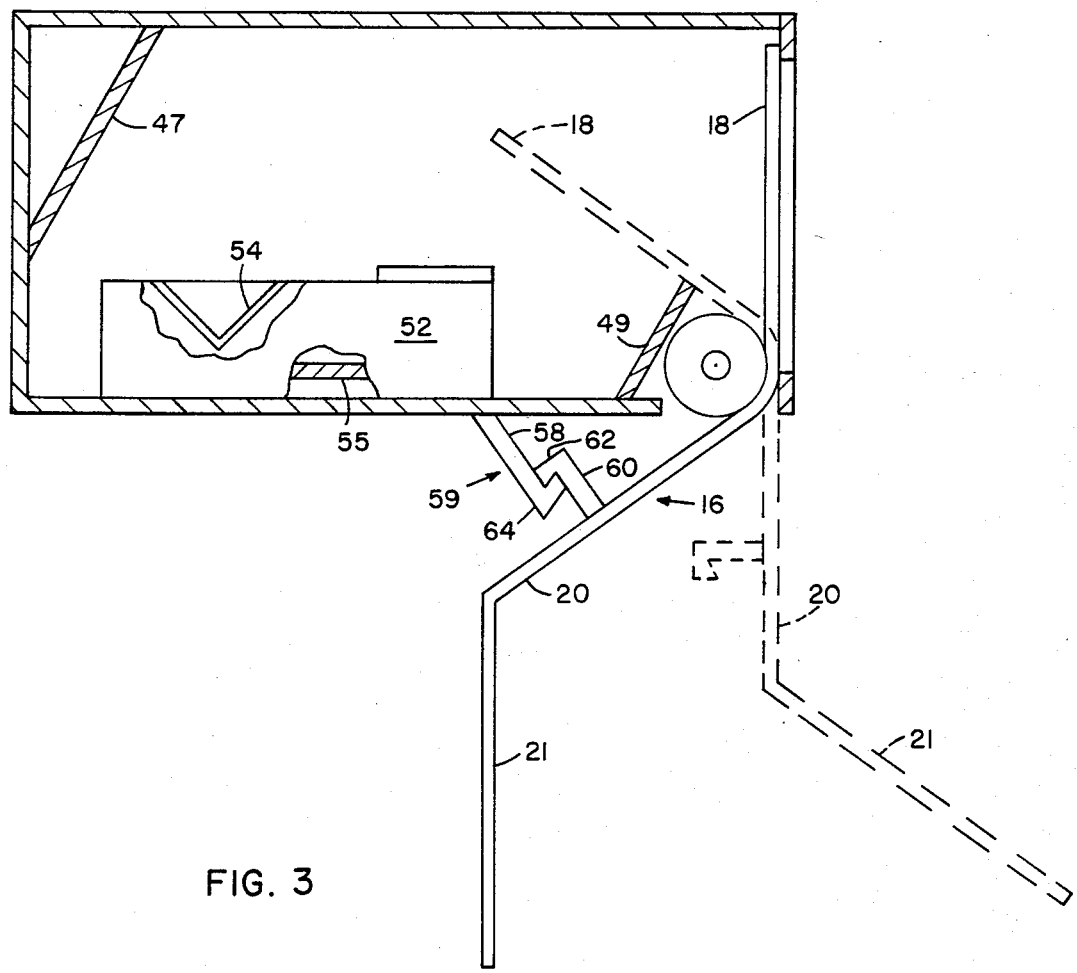
FIG. 3 is an elevational view, partially in section of the box for catching the detonation products and the relative positions of the door prior and subsequent to exposure to the shock.
Figure 2:
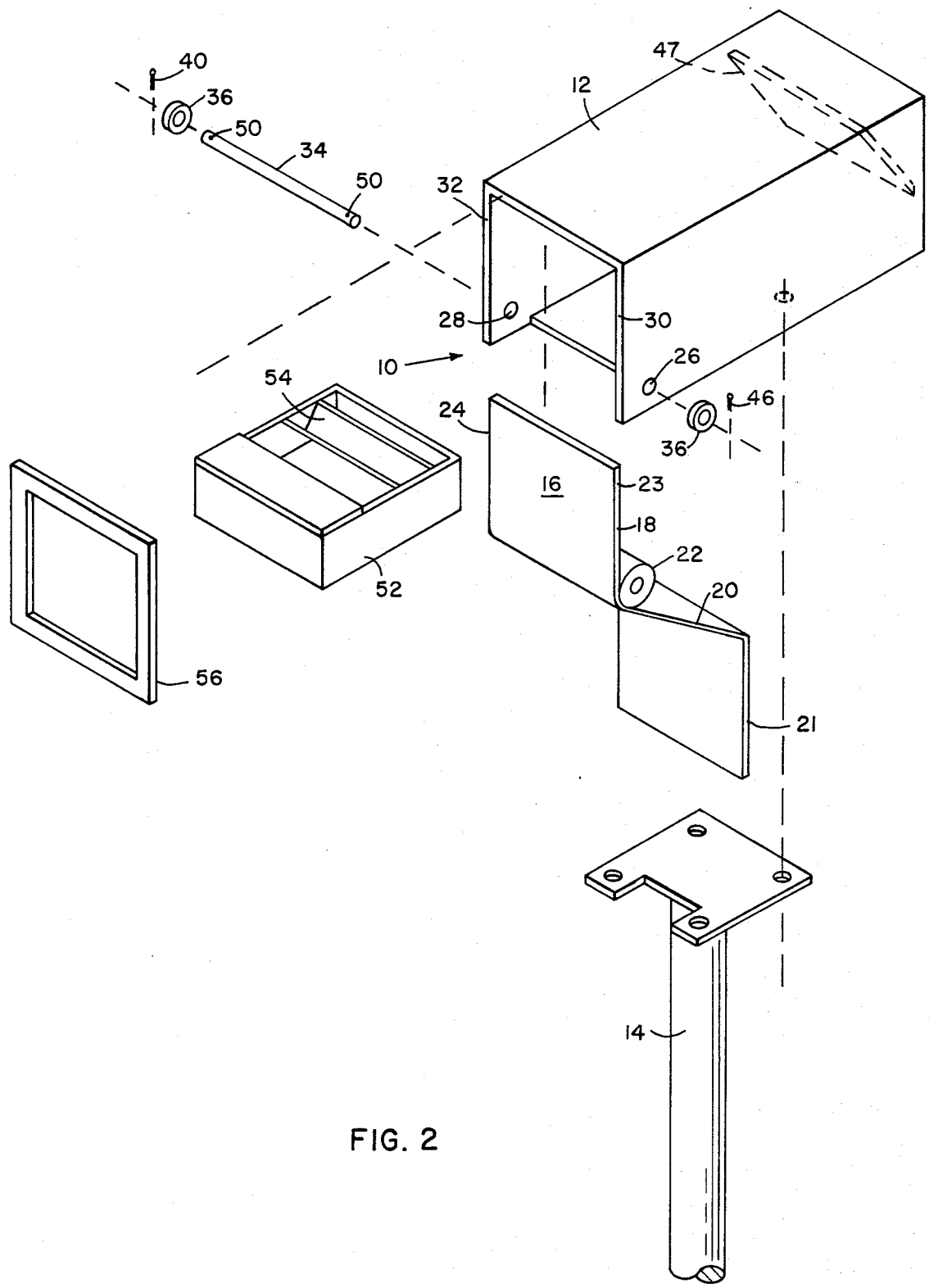
FIG. 2 is an exploded pictorial view of the device of the present invention.

As seen in FIG. 2, the rectangular box 12 is provided with an angled door 16 which is secured to the lower front portion of the box. Door 16 is angled with upper, central and lower portions 18 20, and 21 respectively, disposed at substantially 55°. A hollow shaft or pipe 22 is secured, as by welding, adjacent the junction of portions 18 and 20 and the edges 23 and 24 thereof. Openings 26 and 28 are provided in sides 30 and 32 of box 12. The door is mounted to the box by insertion of a rod 34 through member 22 and openings 26 and 28 and subsequent application of washers 36 on the ends of the rod and insertion of cotter pins 46 in openings 50 of the rod. A pair of baffles 47 and 49 are positioned in the aft and forward portions of box 12 (FIG. 3).

A tray 52 (FIGS. 2 and 3) is provided with a trough 54 and a bottom 55 and is disposed to be secured in box 12. A facing 56 may be secured to the front of the box or, alternatively, a half facing may be welded onto the box (leaving enough room for the tray to be removed).

A latch assembly 59 (FIG. 3) is provided to retain door 16 in closed position. The latch assembly includes a pair of spring steel members 58 and 60 secured to the underside of box 12 and to the central portion 20 of door 16, respectively. Members 58 and 60 include a pair of angled tip portions 62 and 64, respectively, for engaged relation to keep the door secured.

In operation, the box is mounted with door 16 in the open position. Lower portion 21 balances the door in this position. The open end of the box is oriented toward the point of detonation. The solid products ahead of the shock front are allowed to enter the box through the open door. The shock front approaches the box and pressure is applied in two ways to close the door. Pressure is applied to the front, bottom portions 20 and 21 of the door. Also reflective pressure from air reflecting off the two air baffles 47 and 49 (FIG. 3) is applied to the rear, top half 18 of the door. The door is closed by the shock front trapping the products inside.

We claim:

1. Apparatus for trapping a sample of detonation products which precedes the shock front during the detonation process comprising:
   a. a rigidly mounted box, said box having substantially parallel upper and lower surfaces and substantially parallel sides, a closed aft end and an open forward end;
   b. a container carried in said box for retention of said detonation products therein;
   c. a pivotally mounted door having upper, lower and central sections disposed in angular relation, said upper door section carried in said box adjacent said open forward end, said central and lower sections of said box disposed outside of said box below said lower surface thereof, whereby responsive to said shock front applying pressure to said central and lower sections of said door, said door is moved to a closed position for retention of said detonation products in said box; and
   d. locking means associated with said door and said box for retention of said door in said closed position.

2. Apparatus as in claim 1 wherein said door is provided with a substantially Z-shaped configuration formed by said upper, lower and central sections.

3. Apparatus as in claim 2 including means for pivotally supporting said door on said box.

4. Apparatus as in claim 3 wherein said means for pivotally supporting said door includes a rod extending across said opening adjacent said lower surface and a hollow shaft secured to said door for pivotal mounting on said rod for rotation thereon.

5. Apparatus as in claim 4 wherein said hollow shaft is secured to said door at the intersection of said upper and central sections thereof.

6. Apparatus as in claim 5 including a pedestal having said rectangular box secured thereto, said pedestal being rigidly secured to the ground.

* * * * *